Figure 1:
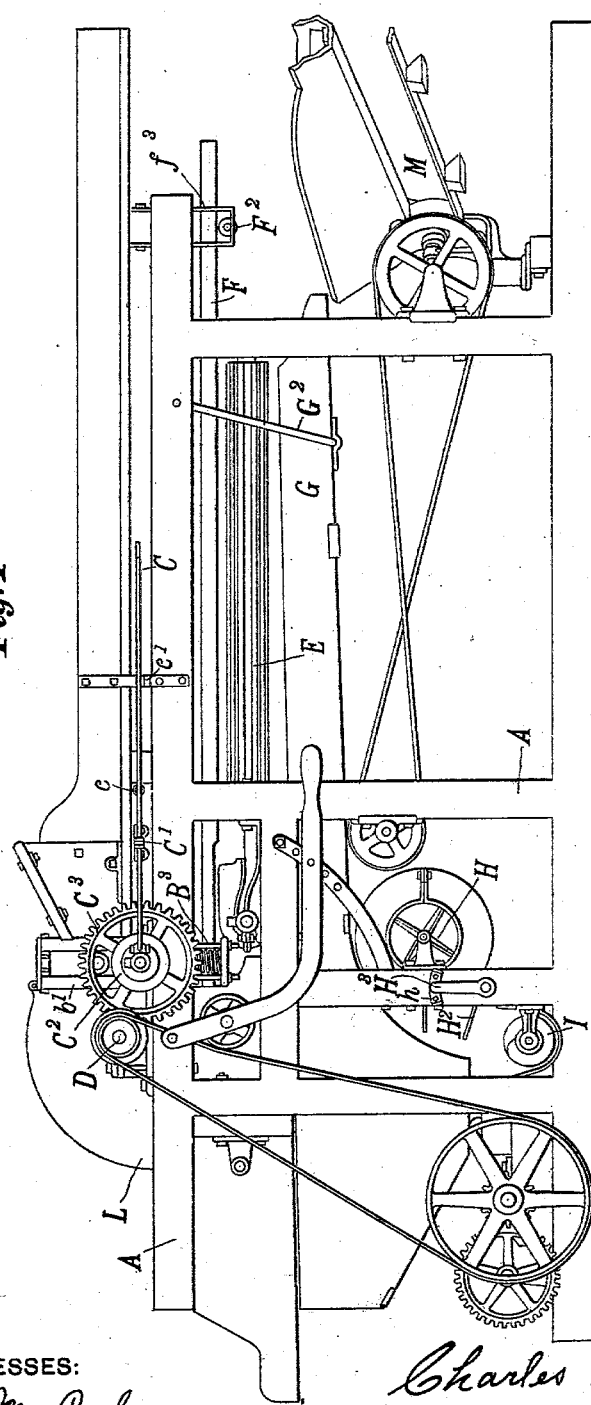

No. 745,483. PATENTED DEC. 1, 1903.
C. E. CURTISS.
CORN HUSKING AND FODDER PREPARING MACHINE.
APPLICATION FILED AUG. 28, 1897.
NO MODEL. 5 SHEETS—SHEET 1.

WITNESSES:
John M. Culver.
Clarence B. Munger.

INVENTOR
Charles E. Curtiss
BY
R. B. Swift.
ATTORNEY.

No. 745,483. PATENTED DEC. 1, 1903.
C. E. CURTISS.
CORN HUSKING AND FODDER PREPARING MACHINE.
APPLICATION FILED AUG. 28, 1897.
NO MODEL. 5 SHEETS—SHEET 2.

WITNESSES:
John M Culver
Clarence B. Munger

INVENTOR
Charles E. Curtiss
BY
R. B. Swift
ATTORNEY.

No. 745,483. PATENTED DEC. 1, 1903.
C. E. CURTISS.
CORN HUSKING AND FODDER PREPARING MACHINE.
APPLICATION FILED AUG. 28, 1897.
NO MODEL. 5 SHEETS—SHEET 3.
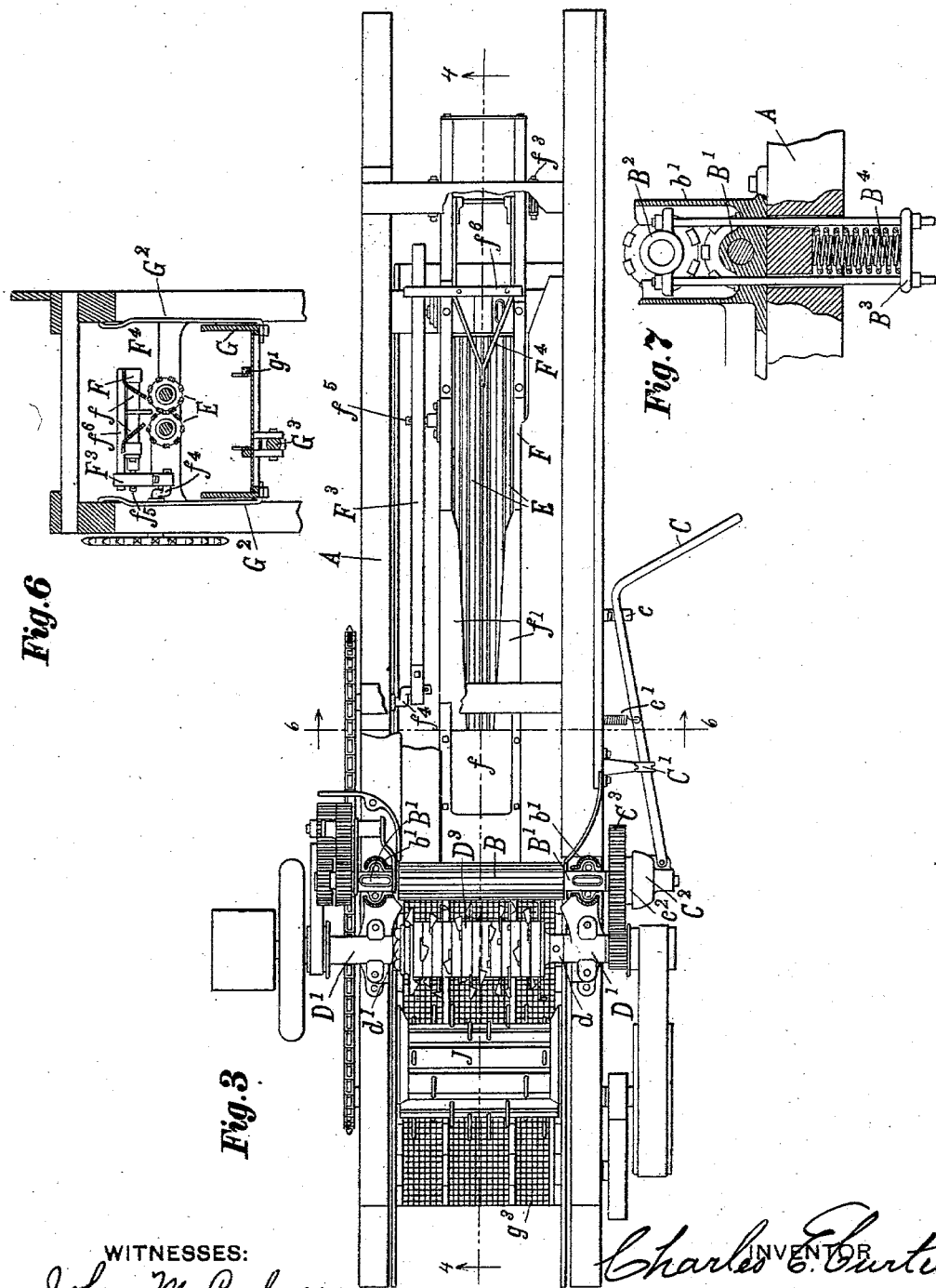
WITNESSES:
John M. Culver
Clarence B. Munger
INVENTOR
Charles E. Curtiss
BY T. B. Swift
ATTORNEY.

No. 745,483. PATENTED DEC. 1, 1903.
C. E. CURTISS.
CORN HUSKING AND FODDER PREPARING MACHINE.
APPLICATION FILED AUG. 28, 1897.
NO MODEL. 5 SHEETS—SHEET 4.
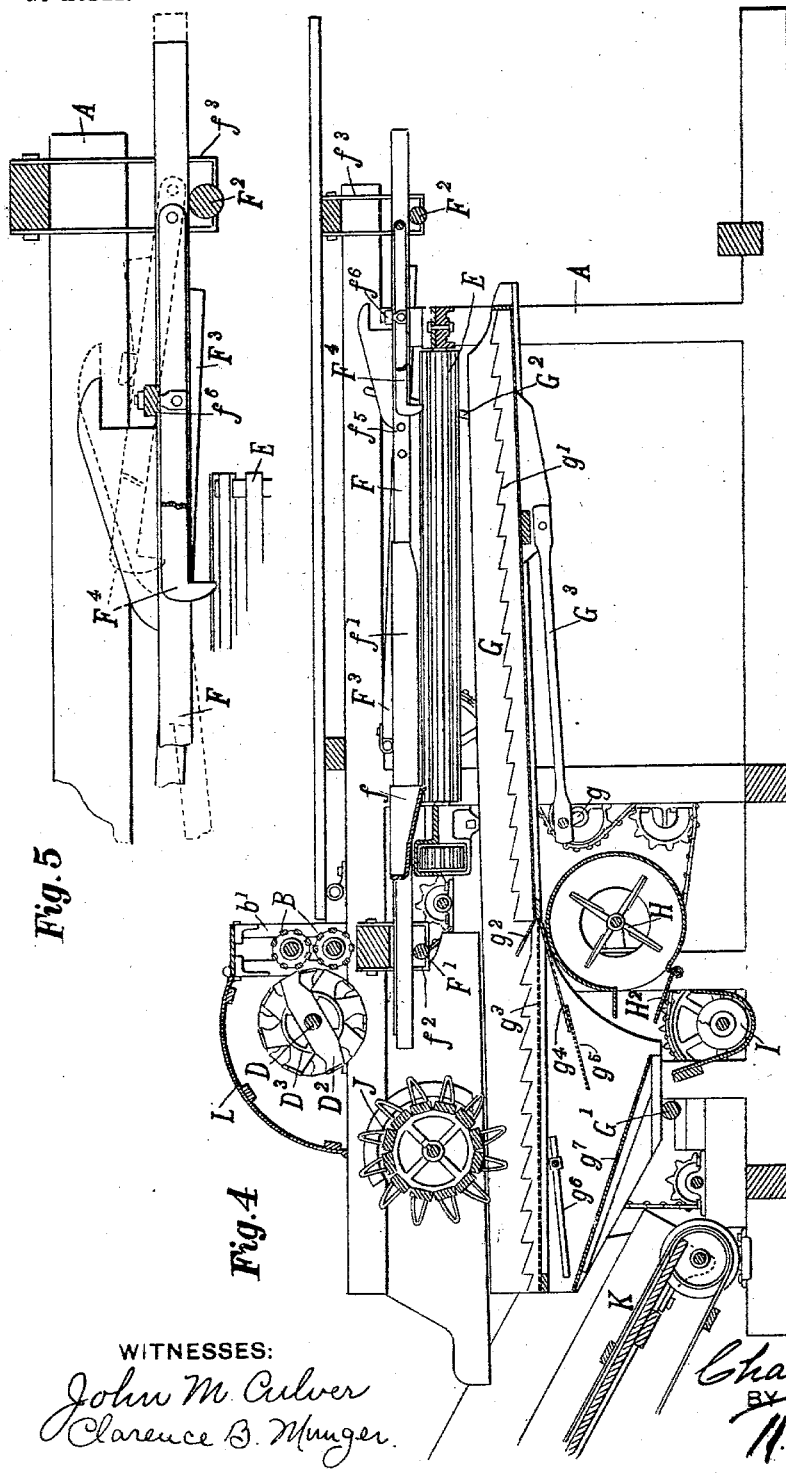

No. 745,483. PATENTED DEC. 1, 1903.
C. E. CURTISS.
CORN HUSKING AND FODDER PREPARING MACHINE.
APPLICATION FILED AUG. 28, 1897.
NO MODEL. 5 SHEETS—SHEET 5.
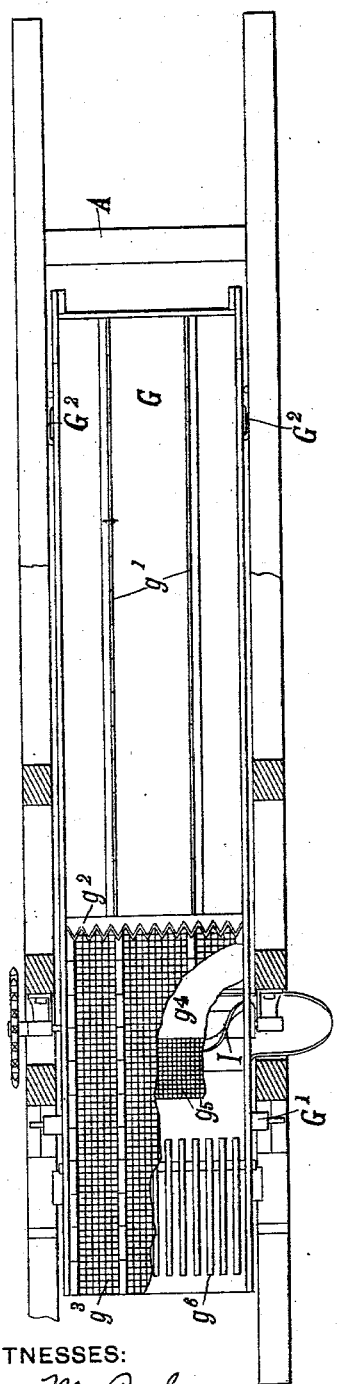
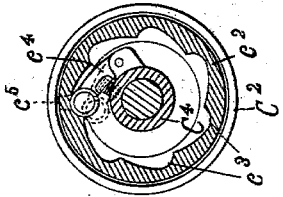
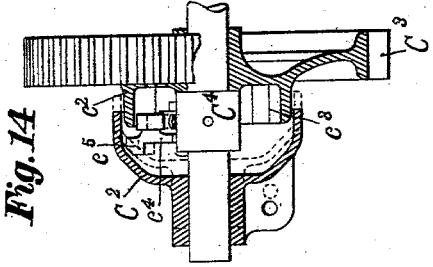
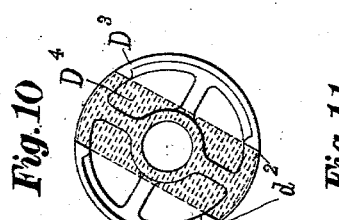
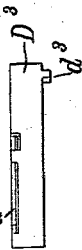
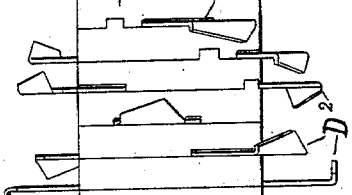
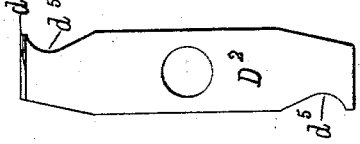
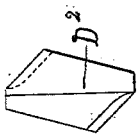
WITNESSES:
John M. Culver
Clarence B. Munger
INVENTOR
Charles E. Curtiss
BY
R. B. Swift.
ATTORNEY No. 745,483.

Patented December 1, 1903.

UNITED STATES PATENT OFFICE.

CHARLES E. CURTISS, OF CHICAGO, ILLINOIS, ASSIGNOR TO THE McCORMICK HARVESTING MACHINE COMPANY.

CORN-HUSKING AND FODDER-PREPARING MACHINE.

SPECIFICATION forming part of Letters Patent No. 745,483, dated December 1, 1903.

Application filed August 28, 1897. Serial No. 649,827. (No model.)

*To all whom it may concern:*

Be it known that I, CHARLES E. CURTISS, a citizen of the United States, residing at Chicago, in the county of Cook and the State of Illinois, have invented a new and useful Improvement in Corn-Husking and Fodder-Preparing Machines, of which the following is a specification.

My invention relates to improvements in corn-husking and fodder-preparing machines in which the stalks of corn are fed to a pair of parallel rollers that snap off the ears, which fall upon husking-rollers, where they are husked and then are delivered into the corn-crib or other receptacle, while the stalks as they pass through the snapping-rollers are torn into shreds by a rapidly-revolving set of knives and then discharged upon a sieve, along which the shredded fodder moves to a fodder-carrier, which carries it to a mow or stack. Any kernels of corn that have been torn from the ears while the ears were being snapped from the stalks or while the husks were being removed are delivered upon a conveyer, which carries them upon a screen, where a current of air drives the lighter particles into the fodder, and the kernels of corn pass through the screen and are delivered into a receptacle at the side of the machine; and the objects of my improvement are, first, to provide an improved knife-head to tear the stalks into shreds; second, to provide a forwarding device to move the ears of corn along the husking-rolls; third, to provide an improved shelled-corn forwarder and cleaner; fourth, to provide improved means for delivering the shredded fodder upon the cleaning-screen; fifth, to provide an improved clutch by which the feeding-roll can quickly be unclutched from the machine, and to provide other details of construction, which will be more fully pointed out in the specification and illustrated in the drawings. I attained these objects by the mechanism illustrated in the accompanying drawings, in which—

Figure 2:
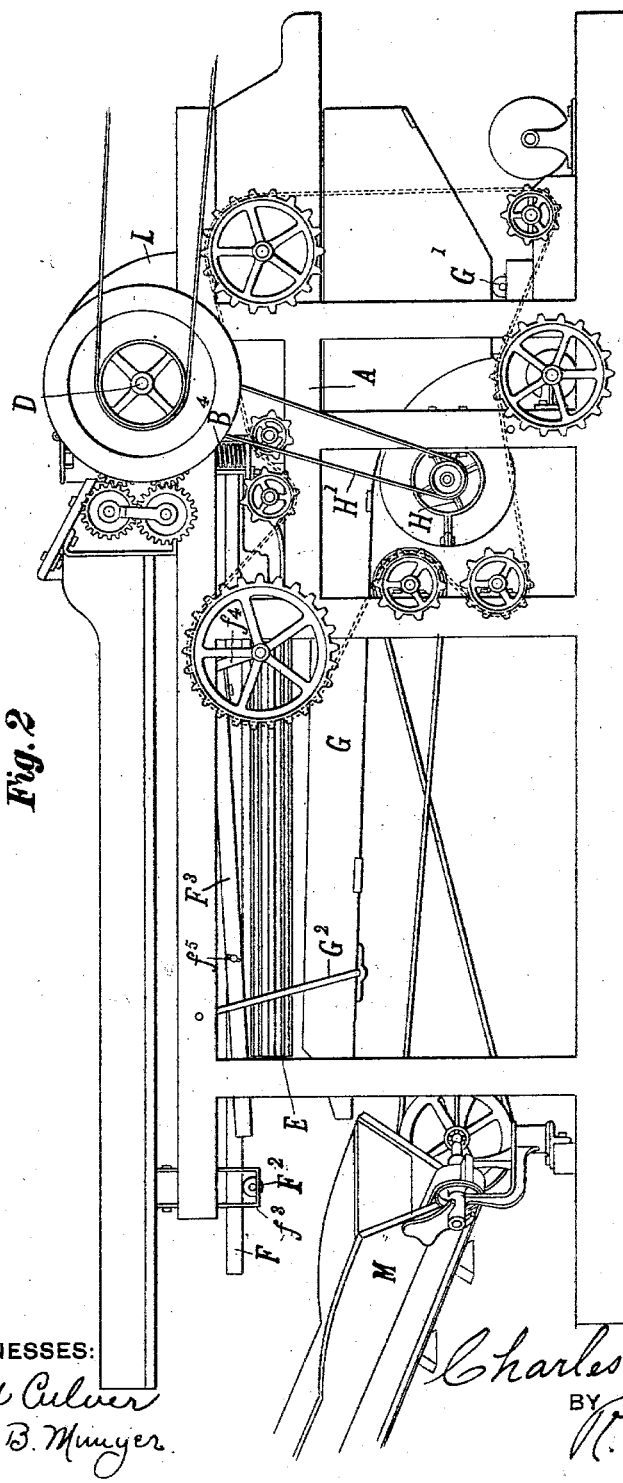

Figure 1 is a side elevation of my improved machine. Fig. 2 is an elevation from the opposite side of machine. Fig. 3 is a top plan view of the machine with the feeding-table removed and the cross-beams partly broken away in order to more clearly show the construction of the parts. Fig. 4 is a vertical sectional elevation on line 4 4 of Fig. 3. Fig. 5 is an enlarged detail of the part of the forwarding device that moves the ears of corn from the husking-roll. Fig. 6 is a cross-sectional view on line 6 6 of Fig. 3. Fig. 7 is a part-sectional view of the spring that regulates the feeding and snapping rolls. Fig. 8 is a horizontal part-sectional view of the shelled-corn carrier and cleaning-screen, a part of the screen being broken away to show other parts of the cleaning device and the conveyer for the shelled corn. Fig. 9 is a plan view of a part of the shredding-knife head. Fig. 10 is a side view of one of the washers that make up the shredding-head, the position of an elastic washer being shown by dotted lines. Fig. 11 is a plan view of one of the washers. Fig. 12 is a side view of one of the shredding-knives. Fig. 13 is an end view of one of the knives. Fig. 14 is a part-sectional view of the safety-clutch, the spur-wheel being broken away to more clearly show the construction of the parts, and the movement of the shipper being shown in dotted lines; and Fig. 15 is an end view, partly in section, of the ratchet-plate and the spring-pressed dog which engages with the notches in the flange.

Similar letters refer to similar parts throughout the several views.

The operative parts of my machine are arranged upon a frame A. This frame is of sufficient width to receive snapping-rolls of any length desired and of sufficient length to accommodate the husking-rolls and corn-cleaning device, and its height is governed by the husking-rolls and corn-cleaning devices. Positioned across the machine are snapping or feeding rolls B. They are built in accordance with the description and claims of the husking-rolls patented by me on June 2, 1896, No. 561,539. These rolls are mounted in bearings, the lower one being fixed in the box B', while the upper one is mounted in a sliding box B², whose movement is guided by uprights b' on the box B'. The upper roll is held against the lower by a yielding pressure by means of a hanging stirrup B³, that passes through the frame of the machine and supports in its lower member a coiled spring B⁴. This spring is adjusted by tightening and loosening the nuts on the lower end of the stirrup. The stalks of corn are delivered upon the machine and fed to these snapping-rolls, which grasp them and feed them along. When the ears are reached, they being of larger diameter than the stalks are pressed from the stalks by the rollers.

The operator stands at the side of the machine, so that one hip comes against the bent lever C, which is supported on the fulcrum C', that is attached to the machine-frame. The bent end is guided by a guide $c$, while a spring $c'$, that is attached to the lever and the frame, holds the bent end of the lever close to the machine-frame and against the operator. The other end of the lever is connected to a bell-shaped shipper $C^2$, that is loosely mounted on the end of the driven shaft of the feed-roller B. There is also loosely mounted on this shaft a spur-wheel $C^3$, which is given motion by an operative part of the machine. This spur-wheel is provided with a flange $c^2$, that is fitted with ratchets $c^3$. A collar $c^4$ is also positioned on the same shaft and keyed fast thereto. In this collar the spring-pressed dog $c^4$ is pivoted, and it has an extension $c^5$, that has a beveled face and which is located in the path of the bell-shaped shipper $C^2$. The bell portion of the shipper $C^3$ will when the operator presses against the bent lever C come in contact with the extension $c^5$ of the pivoted spring-pressed dog $c^4$ and force the dog out of engagement with the ratchets in the flange of the spur-wheel $C^3$. Attention is called to the fact that whenever pressure is brought upon the bent lever and the shipper is slid on the shaft it immediately throws the dog and the parts are unclutched.

The difficulty of feeding cornstalks to fodder-preparing machines is very great and operators pushing the stalk to the snapping-rolls have frequently had their hands caught in these rolls and loss of arms and life has frequently resulted. With my improved construction the lever is so positioned that when the hand of the operator gets close to the feeding-rolls the operator's body will come against the lever and the parts will be unclutched and danger avoided. I am aware that hand unclutching devices have been used, but when caught the operator cannot work the hand-levers, and besides there have heretofore been no clutches designed that were easy enough in operation and none that would stand the strain of being thrown from and into engagement with the rapidly-revolving parts of the machine.

As the stalks pass through the snapping-rolls B they are acted upon immediately by the cutting and shredding head. This consists in my improved machine of a shaft D, that is mounted in boxes D' on the frame A. This shredder-head is formed of knives $D^2$, that are positioned on the shaft and held in place by thick ring washers $D^3$ and elastic washers $D^4$. The manner of fastening these parts to the shaft is as follows: At one end a collar $d$ (see Fig. 3) is pinned to the shaft. It serves as a fixed stop, against which the knives and washers are pressed by a screw-threaded nut $d'$ at the other end of the shaft. The knives and washers are thus revolved by frictional contact of the fixed collar $d$ and the nut $d'$, which is sufficient to revolve the head under ordinary working strain. Should any foreign matter accidentally pass between the snapping-rolls, the knives would stop and breakage be prevented. The diameter of the washers $D^3$ is considerably larger than the shaft and they have a smooth periphery to prevent trash gathering on the rapidly-revolving head. They are fitted with knife-grooves $d^2$, nearly deep enough to take the elastic washers and the knives. The knife-washers are shown more particularly in dotted lines in Fig. 10. The knives are thus prevented from moving without the whole head turns on the shaft, while the elastic washers insure that each knife is rigidly held, and the cushion thus formed prevents the loosening of the nut $d'$ by the vibrations of the machine. The washers also are fitted with projecting lugs $d^3$, which take into corresponding depressions on the contiguous washers. These lugs and depressions, as well as the knife-grooves in the washers, are formed so that the knives will follow each other at intervals, forming a spiral about the shaft. By experience I have found that the preferable angle of the knives is forty-seven degrees, and when so arranged only one knife strikes the stalks at a time, and therefore the power required is lessened, as the shredding action is a continuous one, knife by knife acting on the stalks in rapid succession. The knives $D^2$ are formed from sheets of steel, and their ends $d^4$ are bent at right angles to the main body of the knife and then sharpened to cutting edge, the cutting edge being diagonal to the face of the knife and preferably at an angle of forty-five degrees. The other end of the knife is formed in the same way, but the knife part is turned in the opposite direction. In order to insure the cutting action after the knives have been ground several times and to prevent the edge of the blade striking the stalks, the knife-blade is cut away at $d^5$, so that it forms a hook just before the end of the knife is turned. It will be seen from this construction that the knives can be taken off and sharpened and still the cutting edge not be affected by the front edge of the knife-blade. It has been found difficult to prevent shredding-heads of this kind from winding with trash and the twine with which the bundles are frequently bound. On damp days the shredded fodder will adhere to them until they become filled. The large diameter given to my shredding-head by the knife-washers presents a surface that has a minimum amount of adhesive tendency for shredded fodder, and the position of the knives practically at an angle of forty-seven degrees allows them to shed any particles that may have gathered and still allows a knife-surface that extends the whole width of the shredding-head.

The ears of corn that are snapped or pressed off the stalk by the snapping-rolls D fall upon a set of horizontally-arranged husking-rolls E. There is preferably but one set of these husking-rolls. They are located in the machine practically horizontal and are constructed substantially as are those shown in my previous patent, No. 561,539, granted to me June 2, 1896. The method, however, of moving the ears of corn along these husking-rolls is different from that in my previous patent. In my present construction a reciprocating forwarder F is positioned above the husking-rolls. In the construction shown it consists of two parallel bars, that are connected at their front ends by a cast shield or plate $f$, that covers the boxes and gears of the front end of the husking-rolls and conducts the corn onto the husking-rolls. At the end of this reciprocating forwarder near the snapping-rolls curved and beveled side plates $f'$ are fastened to the bars and extend downwardly over the rolls, and these conduct the ears of corn upon the rolls. These side plates, as is shown more fully in Fig. 3, are brought nearer together at their receiving end than at their delivery end. With the plate $f$, which connects these bars, they form a gradually-narrowing pocket, and when the bars are reciprocated the ears of corn upon the rolls are moved along the rolls and tend to lie lengthwise in the bight of the rolls, which thus have a good chance to grasp the husks. This reciprocating forwarder is mounted at its front end on the cross-roller F', which is supported by stirrups $f^2 f^2$, one on each side of the frame of the machine, and at its rear end on a similar roll $F^2$, which is in turn supported in similar stirrups $f^3 f^3$. Motion is given to this forwarder by means of the pitman $F^3$, which is moved by a crank $f^4$, which is given motion from the machine. The parts therefore move very easily.

Attention is called to the fact that the pitman $f^3$ extends beyond its connection $f^5$ to the reciprocating forwarder F. This extension is vibrated, because of the motion of the crank on the pivot $f^5$ as a center. Pivoted between the side pieces at the delivery end of the reciprocating forwarder F is a hook $F^4$, as shown in Fig. 5. This hook sweeps the delivery ends of the husking-rollers E. Connected with this hook is a cross-piece $f^6$, that extends into the path of the extension of the pitman $F^3$. It is thus plain as the parts are reciprocated the extension of the pitman will raise the hook when the forwarder is moving toward the snapping-rolls, and as the forwarder starts back it will allow the hook to fall and engage the ears of corn, thus delivering them from the end of the husking-rolls. Chains and belts moving the corn along the husking-rolls frequently prevent the ears from getting onto the rolls, and then the husks and silk that the rolls tear from the ears become attached to the chain or wrapped around the sprockets which carry the chain and soon cause trouble. My improved reciprocating forwarder, as just described, keeps the corn moving along the husking-rolls and has no sprockets, pulleys, belts, and chains to become clogged.

The ears of corn as they fall upon the husking-rolls E are more or less covered with husks and silk, which the husking-rolls remove, and which passes between the rolls and is dropped beneath them. When the ears are snapped from the stalks by the snapping-rolls B, these rolls frequently shell some of the kernels from the ears, and when the husking-rolls are removing the husks other kernels are shelled, all of which pass between the husking-rolls and fall into a reciprocating forwarder and cleaner G, which is mounted on the roller G' at its delivery end, which roller extends transversely across the machine and has a bearing upon the framework of the machine, and at its receiving end is hung on links $G^2 G^2$, one on each side of the machine. The pitman $G^3$, which is given motion from a crank $g$, is connected to the forwarder and cleaner G and moves it back and forth on the roller and on the links. Beneath the husking-rolls the framework G is closed, so that any corn and husks that fall into it are, by the vibration of the framework and by the fact that the bottom of the framework beneath the husking-rolls is slightly inclined, slid down the inclined bottom until it passes over a toothed inclined strip $g^2$, that is located at the beginning of a perforated bottom or screen. Notched bars $g'$ are fastened in the bottom and are formed with the long angle of their notches on the side from which the corn is being forwarded and their abrupt angle on the other side, thus helping to carry the trash and shelled corn onward over the screen as the forwarder and cleaner is reciprocated. The toothed strip $g^2$ also has its obtuse inclination on the side from which the corn-husks are advancing. The delivery end of the forwarder and cleaner G is covered with a coarse screen $g^3$, and beneath this screen there is an inclined plate or shield $g^4$, which carries the corn upon a finer screen $g^5$, which does not extend the full length of the top screen. At the delivery end of the top screen and beneath it is a secondary hinge-screen $g^6$, that is formed of a loosely-pivoted cross-bar, to which are attached lengthwise bars that nearly reach the inclined bottom at the delivery end of the framework G. A fan H is positioned beneath the reciprocating forwarder and cleaner G, near its delivery end, and is mounted in bearings upon the machine-frame and is given motion by the belt H' from the shredder-head. The blast from this fan is controlled by the flap $H^2$, which has the spring-lever $H^3$ attached to it and which is held in place by a perforated plate $h$ on the sill of the machine-frame, as shown more clearly in Fig. 1.

By referring to the drawings in Fig. 4 it will be seen that as the shelled corn and husks are carried down the reciprocating forwarder and cleaner G and delivered upon the screen the corn will fall through the screen and any light particles of dirt and pieces of stalks that may perchance fall with it will be blown from the framework by the force of the wind from the fan H. The kernels of corn being heavier will slide down the inclined guard $g^7$ upon an endless screw-carrier I, which is mounted in bearings upon the machine-frame and which is given motion by an operative part of the machine and carries the cleaned shelled corn from the side of the machine and delivers it in a pile upon the ground or into a receptacle arranged to receive it.

The cornstalks after passing through the snapping-rolls B are immediately torn into shreds by the knives on the shredder-head. This shredder-head runs with great speed and delivers the shredded fodder upon a toothed drum J. This drum is positioned in the machine-frame beneath the shredder-head and slightly toward the delivery end of the machine therefrom. It rotates against the stream of oncoming fodder, carrying the fodder beneath it and delivering it upon the screen $g^8$ beneath the shredder-head, where it is agitated by the reciprocations of the screen and where any kernels of corn that may be in the fodder will be allowed to fall through the screen. The notched bars $g'$ extend the full length of the forwarder and cleaner G, and they, in conjunction with the toothed drum J and the fan H, carry the fodder onward along the screen and deliver it upon an endless fodder-carrier K. A hinged cover L surmounts the shredder-head and directs the stream of fodder upon the drum J. I am aware that there have been attempts made to clean the shelled corn in corn-husking and fodder-preparing machines; but I know of no one who has arranged a reciprocating vibrating cleaner and carrier beneath the husking-rolls and shredder-head and who has arranged a reverse-moving drum to throw the fodder from the shredder-head back into the machine upon the screen, and as the reciprocating forwarder and cleaner brings the fodder along to assist in moving the fodder on the screen to the fodder-elevator. The arrangement as shown in the drawings and as heretofore described makes a compact simple machine, keeping all of the operative parts grouped together.

A swivel-carrier for the ears of corn is shown in Fig. 1 and is marked M. The receiving end of the fodder-carrier K is shown more clearly in Fig. 4.

Having now described my invention, what I desire to secure by Letters Patent is—

1. In a machine of the class described, in which the material is fed to the rolls by hand, a safety device consisting in the combination with the feeding or snapping rolls, of a clutch for connecting and disconnecting said rolls with their driving-gearing, and means for operating said clutch, said clutch-operating means being so located that the body of a person standing in the proper position for feeding the stalks will necessarily come into contact therewith and disconnect the gearing before it is possible for his hands to reach the rolls.

2. In a corn-husking machine, the combination of the feeding-rolls, the husking-rolls, an ear-guide and forwarder overlying the husking-rolls and consisting of a frame open at the center and sliding on guides, the receiving end of said frame having inclined plates forming an opening above the rolls of gradually-increasing width toward the delivery end.

3. In a corn-husking machine, the combination of the husking-rolls, a sliding frame above said rolls, an ear-forwarding hook loosely pivoted to said frame, means for raising said hook in its movement toward the receiving end of the rolls and letting it fall in the reverse movement, and means for giving a long and slow reciprocatory movement to the frame.

4. In a corn-husking machine, an ear guide and forwarder consisting of a frame open in the center and sliding on guides, the receiving end of said frame having inclined plates shaped to constitute a guiding-trough tapered to form an opening of gradually-increasing width toward the delivery end, in combination with a hook pivoted on said frame and extending toward the receiving end thereof, means for raising and lowering said hook, and means for giving the frame a long and slow reciprocating movement.

5. In a corn-husking machine, the combination of the husking-rolls, a reciprocating ear-forwarder having one end closed, and having a pivoted hook at the opposite end, a crank to give motion to the reciprocating forwarder, a pitman connecting the crank with the forwarder, and a cross-beam attached to the pivoted hook and extending into the path of the pitman, whereby when the pitman is operated by the crank it will strike the cross-beam thus raising the hook.

6. In a corn-husking machine, the combination of feed-rolls, husking-rolls arranged at right angles thereto and with their gearing at the end nearest the feed-rolls, and an ear guide and forwarder overlying the husking-rolls and consisting of a sliding frame closed at its receiving end by a shield that covers the roll-gears, said forwarder having inclined side plates forming an opening which increases in width toward its delivery end.

7. In a machine for preparing cornstalks for fodder, the combination of the feed-rolls, a shredder located at the delivery side of said rolls and revolving so as to throw the material downward, a toothed drum located beyond and below the shredder in position to receive the cut stalks therefrom, and a shaking-screen below the toothed drum, the adjacent faces of the shredder and drum being revolved in opposite directions so that the drum deflects the stream of cut material received from the shredder and throws it down upon the screen without the interposition of deflectors or other intermediate devices.

8. In a machine for husking corn and preparing the stalks for fodder, the combination of snapping-rolls, husking-rolls located forward of and below said snapping-rolls, a reciprocating forwarder and cleaner beneath the husking-rolls for carrying the husks to the rear and sifting out the shelled corn, a revolving shredder at the delivery side of the snapping-rolls, and a toothed drum located beyond and below the shredder in position to receive the cut stalks therefrom, the adjacent faces of the shredder and drum being revolved in opposite directions so that the drum deflects the stream of cut material and throws it downward while the lower side of the drum assists in moving the mingled husks and shredded stalks along the reciprocating forwarder.

9. In a fodder-shredding machine, a shredder-head, consisting of a shaft, a series of disks strung on said shaft, a series of knife-blades clamped between said disks, said blades having their outer ends bent at right angles to the body of the blades, the cutting edges of said bent ends standing at an acute angle to said body, and the blades being so arranged around the head that the bent ends will strike the stalks alternately on opposite sides, cutting partially through the same.

10. In a fodder-shredding machine, a shredder-head comprising a shaft, a series of interlocking disks strung thereon, notches in said disks, elastic washers seated in the notches, knife-blades secured in said notches against the washers, and means for locking the disks together and securing them to the shaft.

11. In a fodder-shredding machine, a shredder-head having radially-projecting knife-blades, the outer ends of said blades being bent laterally and provided with diagonal cutting edges, and the blades being cut away as at $d^5$ adjacent to the bent ends.

12. In a fodder-shredding machine, a shredder-head comprising a shaft, radially-projecting knives, interlocked disks strung on the shaft and notched to receive the knives, elastic washers seated in the notches, and means for frictionally clamping the disks and knives as a whole to the shaft.

13. A shredder-head for fodder-preparing machines, comprising a shaft, and a series of knife-blades projecting outwardly therefrom and arranged spirally around the shaft, said blades having their outer ends bent laterally and provided with cutting edges so arranged that they will strike the stalks alternately on opposite sides.

14. A shredder-head for fodder-preparing machines, comprising a shaft, a series of disks having notches at diametrically opposite points, a series of knife-blades extending diametrically across the shaft and disks and seated at opposite ends in the notches, said knife-blades having central perforations through which the shaft passes loosely, and means for locking the disks together and securing them to the shaft.

15. The combination of the shredder-shaft, the knives strung loosely on the shaft and projecting at diametrically opposite points therefrom, and the washers $D^3$ having rims provided with notches to receive the knives and with projections $d^3$ to interlock with corresponding notches in adjacent washers, the knives being separate from the washers and held from rotation on the shaft by the notches in the rim.

16. The combination of the shredder-shaft, the washers $D^3$ thereon having rims provided with notches, and knives $D^2$ strung loosely on the shaft and projecting at opposite points therefrom, said knives being separate from the washers, and the washers being provided with projections $d^3$ to interlock with corresponding notches in adjacent washers.

17. The combination of the shredder-shaft, the interlocking washers sleeved loosely thereon and notched at diametrically opposite points, the knives having central perforations and strung loosely on the shaft so as to extend diametrically across the same and through the notches in the washers, and means at the ends of the series of knives and washers to secure the whole to the shaft, the knives being separate from the washers and held from rotation on the shaft by the notched rims.

CHARLES E. CURTISS.

Witnesses:
F. E. EVERS,
B. S. McCLARY.